United States Patent [19]

Choate et al.

[11] Patent Number: 4,586,234
[45] Date of Patent: May 6, 1986

[54] TRANSFER APPARATUS AND METHOD FOR AIR SPRING ASSEMBLY APPARATUS

[75] Inventors: Bruce T. Choate, Akron; Richard C. Houck, Clinton, both of Ohio

[73] Assignee: The Goodyear Tire & Rubber Company, Akron, Ohio

[21] Appl. No.: 564,490

[22] Filed: Dec. 22, 1983

[51] Int. Cl.$^4$ .............. B21D 39/03; B23P 11/00; B23P 19/04; B66F 1/00
[52] U.S. Cl. .......................... 29/430; 29/505; 29/559; 29/700; 29/796; 29/801; 29/824; 29/33 K; 414/226; 414/745; 414/786
[58] Field of Search ............. 29/157 R, 429, 430, 29/505, 507, 559, 700, 791, 795, 796, 801, 822, 823, 824, 33 K; 198/339.1; 254/134; 383/43; 414/222, 225, 226, 745, 786

[56] References Cited

U.S. PATENT DOCUMENTS

| | | | |
|---|---|---|---|
| 2,947,513 | 8/1960 | Nolden et al. | 254/134 X |
| 2,962,262 | 11/1960 | Garver et al. | 254/134 |
| 3,302,927 | 2/1967 | Gray | 254/134 X |
| 3,773,293 | 11/1973 | Arnes | 254/134 |
| 4,236,861 | 12/1980 | Grove | 414/745 X |
| 4,262,408 | 4/1981 | Johnson et al. | 29/507 |
| 4,371,302 | 2/1983 | Frias et al. | 414/745 X |
| 4,491,449 | 1/1985 | Hawkins | 414/745 X |

FOREIGN PATENT DOCUMENTS 202735  11/1983  Japan ...................... 29/700

Primary Examiner—Howard N. Goldberg
Assistant Examiner—R. S. Wallace
Attorney, Agent, or Firm—Frederick J. Lacher; T. P. Lewandowski

[57] ABSTRACT

Air spring components and the completed air spring are carried by an air spring unloader, an end cap holder and a tubular member loader of a shuttle mechanism along a track member adjacent an air spring assembly apparatus. The shuttle mechanism is movable to three positions controlled by stop members so that the air spring can be transferred to the unloader, the end cap can be inserted in a recess of the assembly apparatus and the tubular member positioned for processing by the assembly apparatus. Simultaneously with some of these operations the air spring is transferred to a conveyor and the end cap is transferred from a loading support to the end cap holder. The loader and unloader each have a vertically movable cradle with an overarm clamp for supporting and releasing the tubular member and air spring. The end cap holder has a resiliently mounted chuck on a sliding support for transferring an end cap from a recess in the loading support and inserting the end cap in a recess of the assembly apparatus.

28 Claims, 10 Drawing Figures

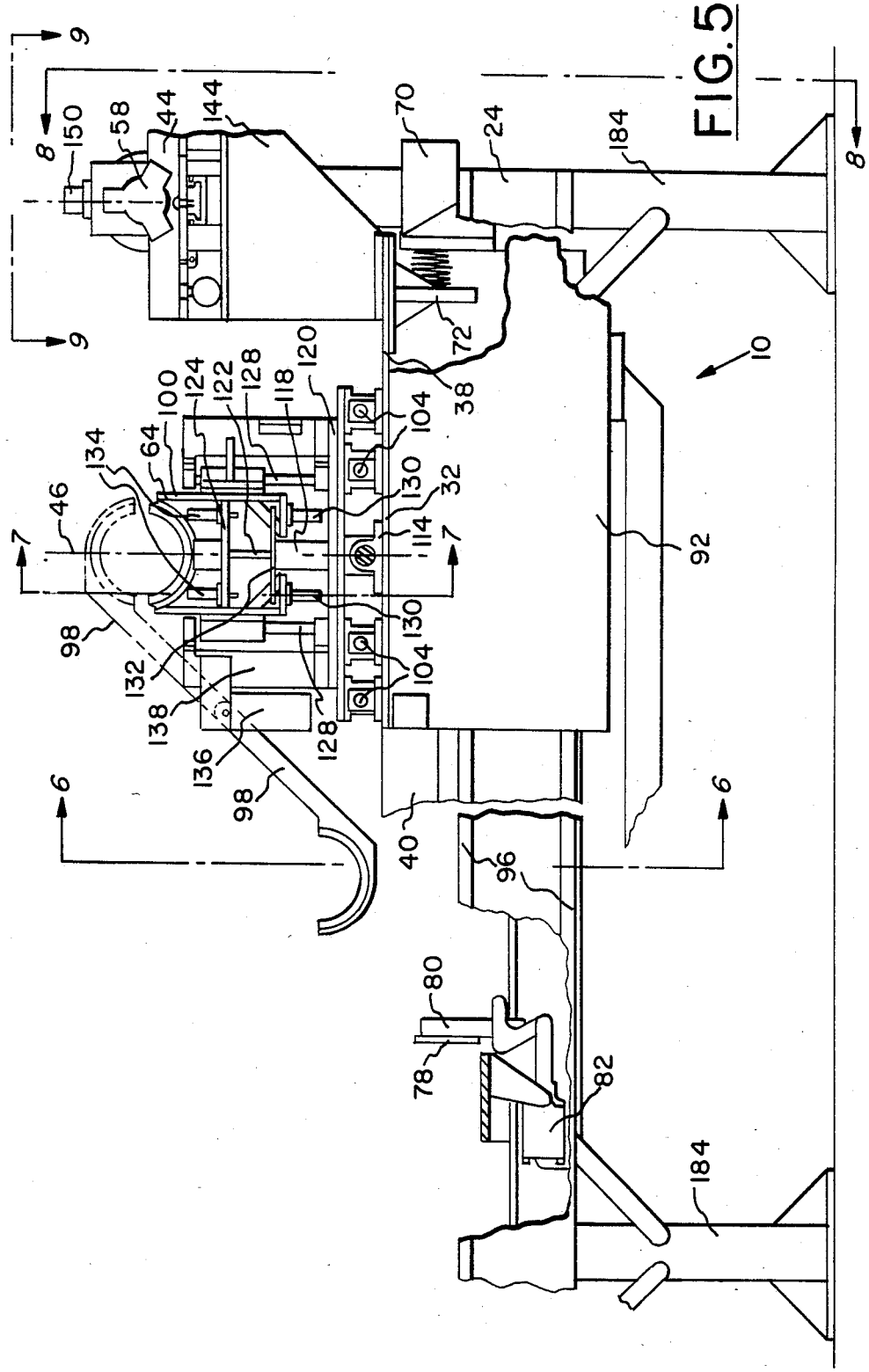

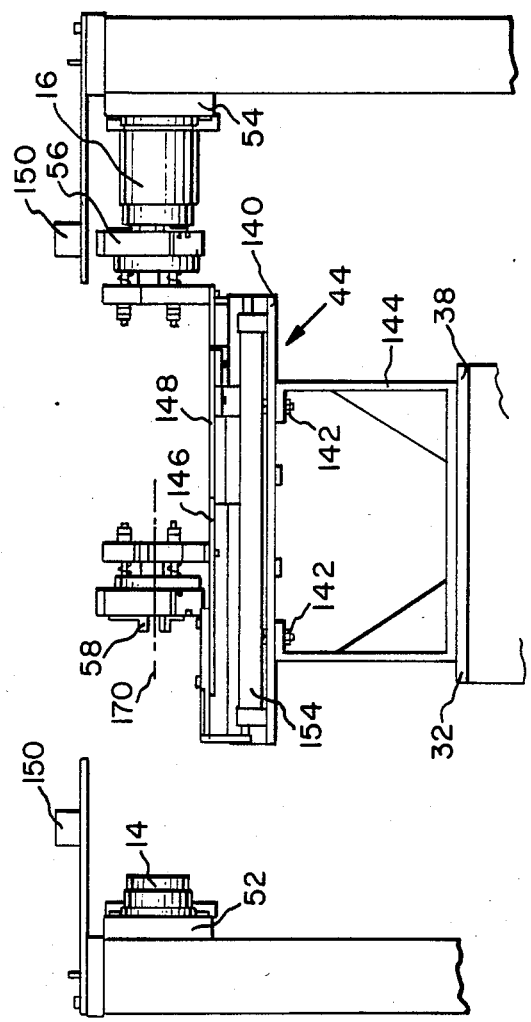
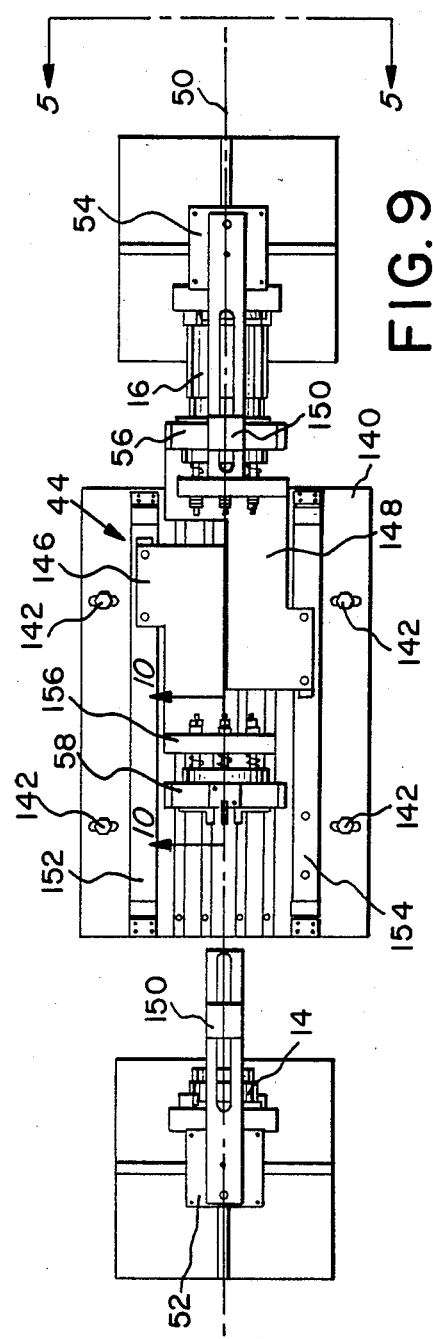
FIG. 8
FIG. 9

TRANSFER APPARATUS AND METHOD FOR AIR SPRING ASSEMBLY APPARATUS

This invention relates to an apparatus and method for loading air spring components and unloading the completed air spring from an air spring assembly apparatus. The air spring components may include a flexible sleeve and at least one end cap for insertion into one end of the sleeve. A ring is positioned over the sleeve and after assembly of the air spring the ring is crimped against the wall of the end cap. Manual loading and unloading of the air spring assembly apparatus is possible; however, only one operation such as unloading the air spring or positioning the end cap and sleeve for loading can be performed at one time. Also the precision attained during loading of the sleeve and end caps is dependent on the dexterity and concentration of the operator. In order to obtain the production of quality air springs which the assembly apparatus is capable of producing, a transfer apparatus and method is needed which can rapidly perform more than one operation at a time with repeatable precision.

The present invention is directed to an apparatus and method for loading the air spring components and unloading the air spring with precision and in a short cycle time.

In accordance with one aspect of the invention there is provided a method of loading air spring components and unloading an air spring from an air spring assembly apparatus in which an end cap is inserted in at least one open end of a tubular member for crimping of a ring positioned over the tubular member against the wall of the end cap comprising:

(a) moving a shuttle mechanism including an air spring unloader, a tubular member loader and an end cap holder to a first position with the air spring unloader at an operating position of the assembly apparatus for receiving an assembled air spring from the assembly apparatus, with the loader positioned at a feeding position spaced from the operating position for receiving the tubular member and further with the end cap holder at an end cap feeding position spaced from the operating position for receiving an end cap;

(b) moving the shuttle mechanism to a second position with the unloader positioned at an unloading location for transfer of the air spring from the unloader and with the end cap holder at the operating position for transfer of an end cap to the assembly apparatus; and (c) moving the shuttle mechanism to a third position with the loader positioned at the operating position of the assembly apparatus for transfer of the tubular member to the assembly apparatus.

In accordance with another aspect of the invention there is provided a loading and unloading apparatus for loading air spring components and unloading an air spring from an assembly apparatus in which an end cap is inserted in at least one open end of a tubular member for crimping of a ring positioned over the tubular member against the wall of the end cap comprising a track member providing a path adjacent an operating position of the assembly apparatus, a shuttle mechanism having a base member carried by the track member and movable along the path, an air spring unloader and an end cap holder mounted on the base member at spaced-apart locations, a tubular member loader mounted on the base member at a location spaced from the unloader and the end cap holder, the shuttle mechanism being movable along the path to a first position where the air spring unloader is positioned at the operating position of the air spring assembly apparatus for transferring the air spring to the unloader, the shuttle mechanism being movable to a second position where the end cap holder is positioned at the operating position for transferring the end cap to the assembly apparatus and the shuttle mechanism being movable to a third position where the tubular member loader is positioned at the operating position for transferring the tubular member to the assembly apparatus.

To acquaint persons skilled in the arts most closely related to the present invention, a preferred embodiment thereof illustrating a best mode now contemplated for putting the invention into practice is described herein by and with reference to the annexed drawings forming a part of the specification. The embodiment shown and described is illustrative and as will be apparent to those skilled in the art can be modified in numerous ways within the spirit and scope of the invention as defined in the claims hereof.

In the drawings:

FIG. 5 is an enlarged detailed fragmentary elevation of the end cap holder and tubular member loader with the air spring components removed, taken along the line 5—5 in FIG. 1 and with parts being broken away to show the stop members for limiting movement of the shuttle mechanism.

FIG. 8 is a fragmentary end view of the end cap holder and loading supports taken along line 8—8 in FIG. 5 showing one expandable chuck and sliding support member in the extended position and the other chuck and sliding support member in the retracted position.

FIG. 9 is a plan view of the end cap holder and loading supports shown in FIG. 8 taken along the line 9—9 in FIG. 5.

Figure 1:
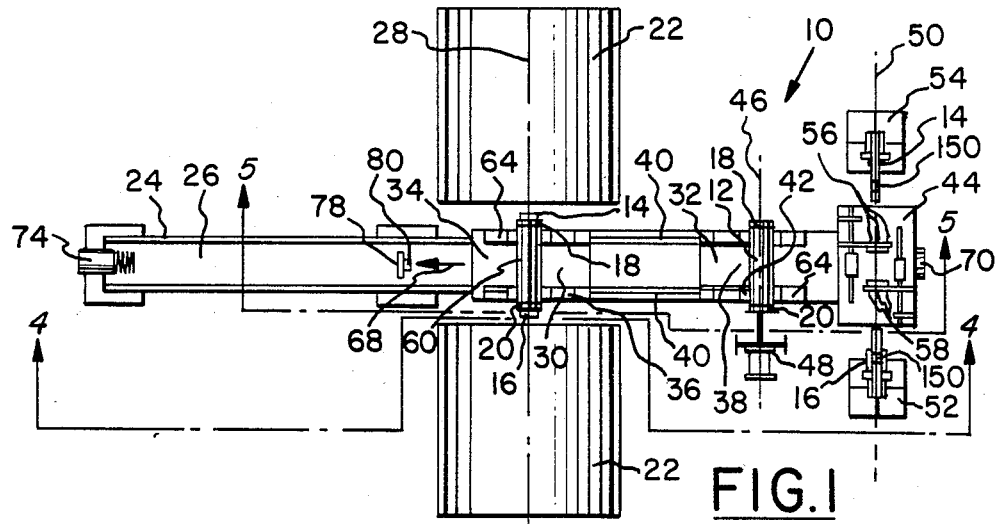
FIGS. 1, 2 and 3 are schematic plan views of the apparatus embodying the invention showing the shuttle mechanism in the three operating positions with relation to the air spring assembly apparatus.
Figure 4:
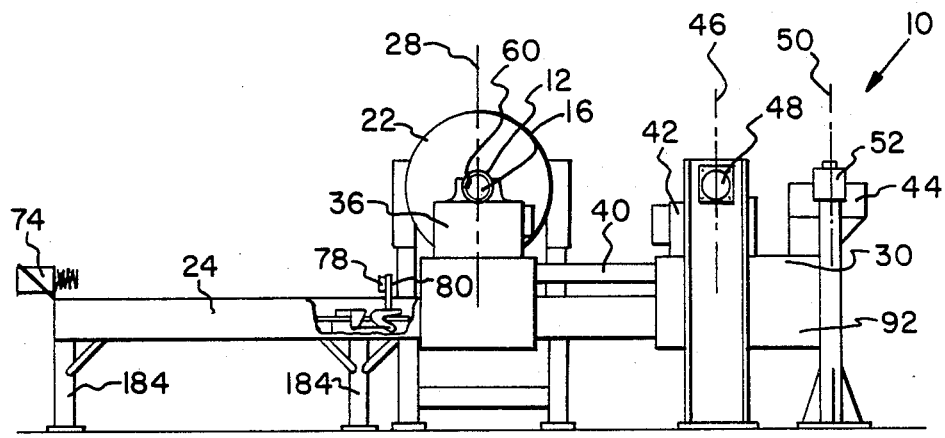
FIG. 4 is a schematic elevation taken along the line 4—4 in FIG. 1.

Referring to FIGS. 1 and 4, a loading and unloading apparatus 10 is shown for loading air spring components such as a tubular member which may be an open-ended cylindrical sleeve 12 and end caps 14 and 16 for insertion in the ends of the sleeve. Metal rings 18 and 20 are positioned over the ends of the sleeve 12 for crimping the sleeve against the walls of the end caps 14 and 16 by an air spring assembly apparatus 22.

The loading and unloading apparatus 10 includes a track member 24 providing a path 26 adjacent to the air spring assembly apparatus 22 at an operating position 28. A shuttle mechanism 30 is movable along the track member 24 and includes a base member 32 carried by the track member. The base member 32 may include a first section 34 for supporting an air spring unloader 36 and a second section 38 connected to the first section by side bars 40. A transfer apparatus such as tubular member loader 42 and end cap holder 44 is supported on the second section 38 of the base member 32.

As shown in FIG. 1, the shuttle mechanism 30 is in a first position with the air spring unloader 36 at the operating position 28 of the assembly apparatus 22. The tubular member loader 42 is at a tubular member feeding position 46 where a tubular member positioning guide 48 is located to position the sleeve 12 on the loader. The end cap holder 44 is located at an end cap feeding position 50 where loading supports 52 and 54 are located at each side of the end cap holder 44 for holding the end caps 14 and 16. Expandable chucks 56 and 58 of the end cap holder in extended positions grip the end caps 14 and 16 and then are movable to retracted positions over the end cap holder.

In FIG. 1 an assembled air spring 60 is shown after being assembled and released from the air spring assembly apparatus 22. The sleeve 12 is positioned as by hand on the loader 42 and the end caps 14 and 16 are placed in the loading supports 52 and 54 as by hand prior to being gripped by the expandable chucks 56 and 58. After the chucks 56 and 58 have been moved to the extended positions to grip the end caps 14 and 16 and are then moved to the retracted positions over the end cap holder 44, the shuttle mechanism 30 is moved to a second position a distance 62 which is equal to the distance between the air spring unloader 36 and the end cap holder. This places the end cap holder 44 at the operating position 28 of the assembly apparatus 22. In the second position the air spring 60 can be removed by suitable means well known to those skilled in the art to a conveyor or other apparatus for unloading the air spring from the loading and unloading apparatus 10. The end caps 14 and 16 may be transferred to the assembly apparatus 22 by moving the chucks 56 and 58 to the extended positions and then inserting the end caps in recesses in the assembly apparatus. After the air spring 60 has been removed and the end caps 14 and 16 transferred to the assembly apparatus 22, the chucks 56 and 58 are moved to the retracted positions. The shuttle mechanism 30 is then moved to a third position, shown in FIG. 3, with the loader 42 at the operating position 28 of the assembly apparatus 22. In this position the sleeve 12 is gripped by the assembly appartus 22 for inserting the end caps 14 and 16 and crimping the metal rings 18 and 20 over the ends of the sleeve 12 and against the walls of the end caps 14 and 16.

Figure 2:
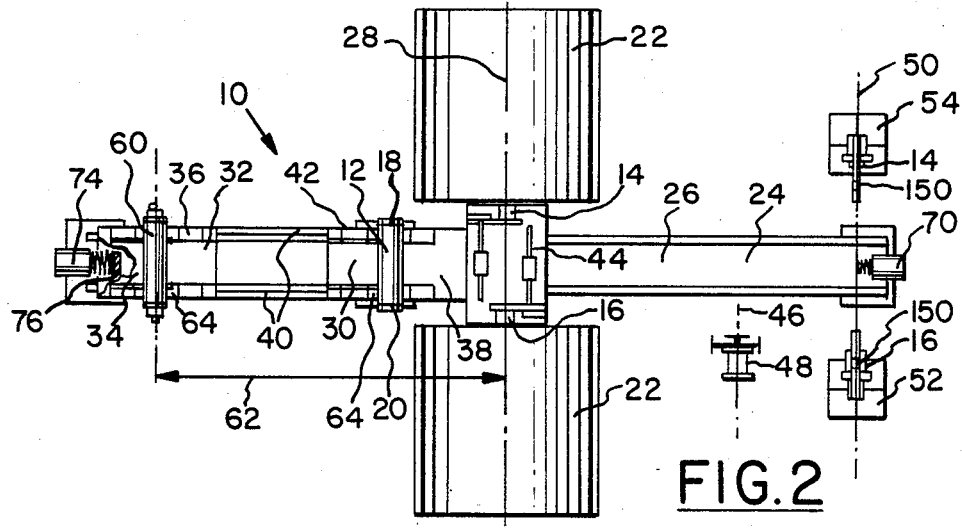
Figure 3:
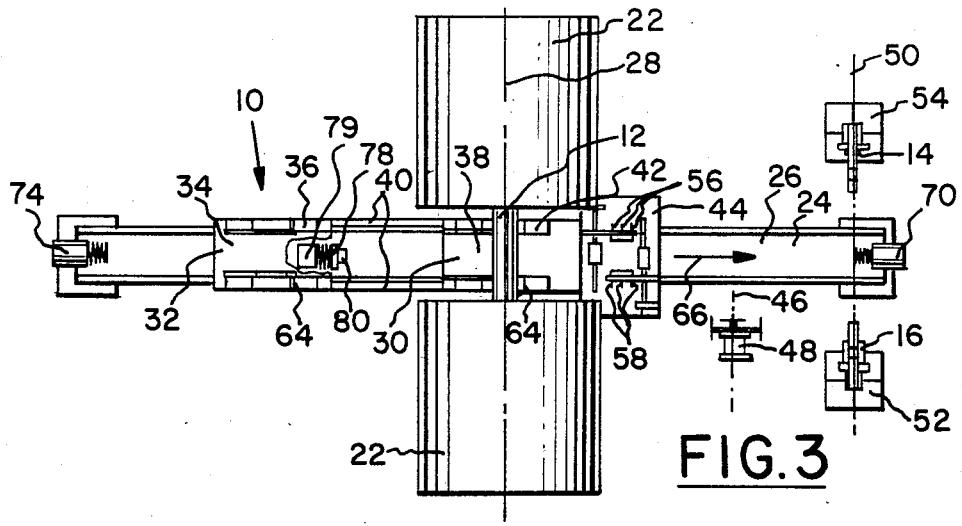

The air spring unloader 36 and tubular member loader 42 may be of the same construction and have vertically movable cradles 64 so that in the first position of the shuttle mechanism 30 the cradle of the unloader 36 may be raised to support the air spring 60 and in the third position shown in FIG. 3, the cradle 64 of the loader 42 may be lowered after the sleeve 12 has been gripped by the air spring assembly apparatus 22. As shown in FIG. 2, the loader 42 is positioned between the end cap holder 44 and the unloader 36.

The shuttle mechanism 30 is moved from the third position in a first direction indicated by arrow 66 to the first position shown in FIG. 1. The shuttle mechanism 30 is then moved in a second direction indicated by arrow 68 to the second position shown in FIG. 2. The shuttle mechanism 30 finally is moved in the first direction 66 from the second position shown in FIG. 2 to the third position shown in FIG. 3. In this manner the unloading of the air spring 60 and the transfer of the end caps 14 and 16 and the sleeve 12 is accomplished with only one change in direction of travel of the shuttle mechanism 30 during one cycle of the operation.

Referring to FIG. 5, a first stop means including a spring and shock absorber unit 70 is mounted on the right end of the track member 24 for engagement with a first stop plate 72 mounted on the underside of the second section 38 of the base member 32. Referring to FIGS. 1, 2, 3 and 4, a second stop means including a second spring shock absorber unit 74 is mounted on the left side of the track member 24. A second stop plate 76 is mounted on the underside of the first section 34 of the base member 32 at the left-hand side as shown in FIG. 2, for engagement with the second spring shock absorber unit 74.

As shown in FIGS. 1, 3, 4 and 5, a third stop means including a retractable plate 78 is mounted on the track member 24 intermediate the ends thereof and is supported on a hinged arm 80 connected to a piston and cylinder assembly 82, as shown in FIG. 5, for raising and lowering the retractable plate 78. The retractable plate 78 in the raised position is engageable with a third spring shock absorber unit 79 mounted on the underside of the first section 34 of the base member 32 at the right-hand side as shown in FIG. 3.

Figure 6:
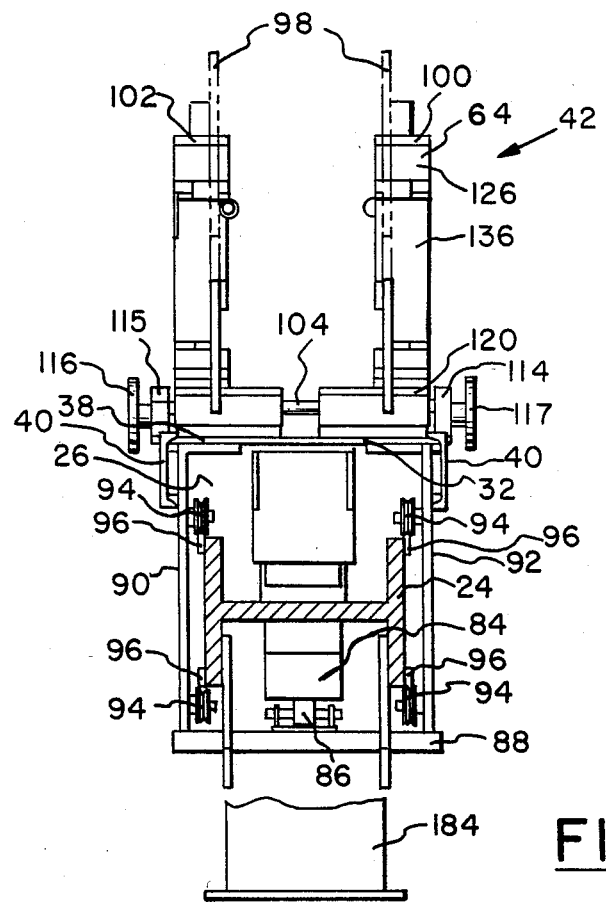
FIG. 6 is a sectional view taken along the line 6—6 in FIG. 5 with parts being broken away.

First power means such as a cylinder 84 mounted on the track member 24 and having a piston connected by a suitable rodless link 86 to a lower plate member 88 of the shuttle mechanism 30 moves the shuttle mechanism in the first direction 66 and second direction 68 depending upon the communication of fluid pressure to the cylinder at opposite sides of the piston. As shown in FIG. 6, the lower plate member 88 is connected to the base member 32 by side plates 90 and 92 which support rollers 94 in rolling engagement with rails 96 mounted on track member 24.

In order to move the shuttle mechanism 30 through a cycle, fluid pressure such as air is introduced into the cylinder 84 to the left of the piston, as shown in FIG. 5, urging the first stop plate 72 in the first direction 66 against the spring shock absorber unit 70 to locate the shuttle mechanism in the first position shown in FIG. 1. Fluid pressure such as air is introduced into the piston and cylinder assembly 82 controlling the retractable stop plate 78 so that the plate will rotate on the hinged arm 80 to the right, as shown in FIG. 5, into a retracted position. Fluid pressure is then communicated to the cylinder 84 to the right of the piston causing the shuttle mechanism 30 to move in the second direction 68 until the second stop plate 76 engages the second spring shock absorber unit 74 at the left end of the track member 24 to locate the shuttle mechanism in the second position as shown in FIG. 2. In order to locate the shuttle mechanism 30 in the third position as shown in FIG. 3, fluid pressure is introduced into the piston and cylinder assembly 82 causing the hinged arm 80 to rotate the retractable stop plate 78 into the operative position shown in FIG. 5. Fluid pressure is then communicated to the cylinder 84 to the left of the piston in the cylinder causing the shuttle mechanism 30 to move in the first direction 66 until the third spring shock absorber unit 79 engages the retractable stop plate 78. Then in order to move the shuttle mechanism 30 from the third position shown in FIG. 3 to the first position shown in FIG. 1, fluid pressure is communicated to the piston and cylinder assembly 82 causing the hinged arm 80 to move clockwise, as shown in FIG. 5, and retract the retractable stop plate 78 so that the shuttle mechanism can move to the first position shown in FIGS. 1 and 5 with the first stop plate 72 engaging the spring shock absorber unit 70. Suitable controls well known to those skilled in the art may be used to control the timing and sequence of the fluid pressure actuated operation of this loading and unloading apparatus 10.

Figure 7:
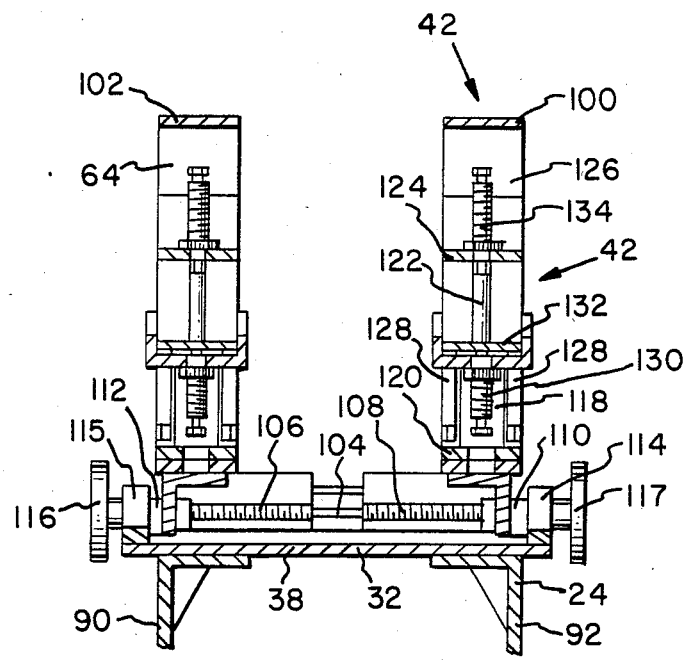
FIG. 7 is a fragmentary sectional view of the tubular member loader taken along the line 7—7 in FIG. 5.

Referring to FIGS. 5, 6 and 7, the tubular member loader 42 is shown in greater detail. The description of the loader 42 also applies to the air spring unloader 36 which has the same construction except that it is mounted on the first section 34 of the base member 32 whereas the loader is mounted on the second section 38 of the base member. Also a pair of overarms 98 for the loader 42 is positioned on the left side of the loader, as shown in FIG. 5, whereas the pair of overarms (not shown) for the unloader 36 is located on the right side of the unloader.

The vertically movable cradle 64 may have a front cradle section 100 and a rear cradle section 102 slidably mounted on rods 104 clamped to the second section 38 of the base plate 32. As shown in FIG. 7, precise positioning of the cradle sections 100 and 102 may be provided by screws 106 and 108 in threaded engagement with threaded bushings 110 and 112 connected to these sections. The screws 106 and 108 are rotatably mounted in pillow blocks 114 and 115 mounted on the second section 38 of the base plate 32 so as to restrict axial movement of the screws relative to the base plate. Movement of the front cradle section 100 and rear cradle section 102 results when the screws 106 and 108 are turned as by adjusting wheels 116 and 117 fastened to the screws. By having a front cradle section 100 and a rear cradle section 102 spaced apart as shown in FIGS. 6 and 7, a collar member may be mounted over the sleeve 12 and the air spring 60 made with the collar in place. Also a different length sleeve 12 may be handled with this loader 42 by adjusting the space between the sections 100 and 102.

As described hereinabove, the vertically movable cradle 64 is desirable for lowering the cradle after the sleeve 12 is gripped by the air spring assembly apparatus 22. This capablility is also desirable with the unloader 36 to raise the cradle 64 into engagement with the completed air spring 60 which is supported by the air spring assembly apparatus 22.

Referring to FIGS. 5 and 7, the mechanism for raising and lowering the front cradle section 100 will be described and this description will also apply to the rear cradle section 102 which has substantially the same mechanism. As shown in FIG. 5, power means such as cylinder 118 is mounted on a cradle section support plate 120 and has a piston rod 122 connected to a cross bar 124 of a front cradle unit 126 which is movable vertically on vertical guide rods 128. Upward movement of the front cradle unit 126 is limited by adjustable screws 130 threaded in the bottom of the front cradle unit and extending into engagement with a movement limiting plate 132 supported on the top of the cylinder 118. Downward movement of the front cradle unit 126 is limited by adjusting screws 134 threaded in the cross bar 124. In operation, fluid pressure such as air is communicated to the cylinder 118 to lift the piston and piston rod 122 causing the front cradle unit 126 to be lifted until the adjusting screws 130 abut the movement limiting plate 132. Then upon release of the fluid pressure from the cylinder 118, the front cradle unit 126 will drop until the adjusting screws 134 contact the movement limiting plate 132.

With reference to FIG. 5, the overarms 98 are pivotally mounted on each of the cradle sections 100 and 102 for swinging movement between an open release position spaced from the cradle shown in full lines and a closed clamping position over the cradle shown in dotted lines. Suitable power means such as cylinders 136 and 138 containing pistons connected to chains for engagement with sprocket mechanisms may be utilized to move the overarms 98 between the clamping and release positions.

Figure 10:
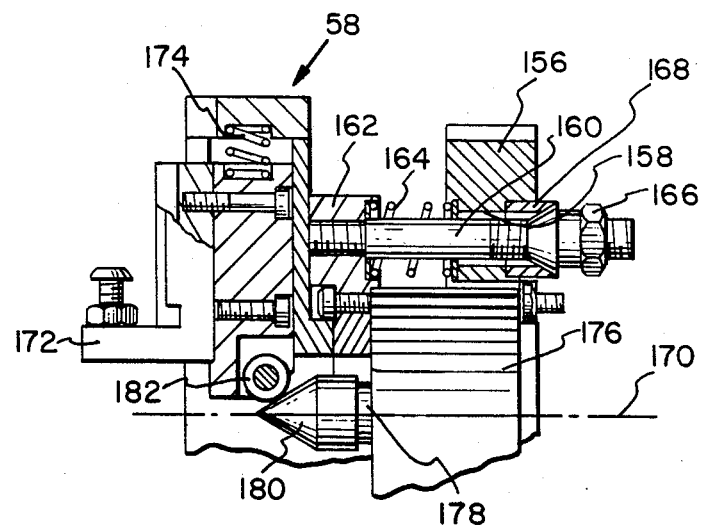
FIG. 10 is an enlarged fragmentary sectional view of the expandable chuck and compliant mounting of the end cap holder taken along the line 10—10 in FIG. 9.

Referring to FIGS. 8, 9 and 10, the end cap holder 44 is shown in greater detail. A bed plate 140 of the end cap holder 44 is adjustably mounted by bolts and nuts 142 to a frame 144 fastened to the second section 38 of the base member 32. Each of the expandable chucks 56 and 58 are mounted on a sliding support member such as sliding plates 146 and 148, respectively. The sliding plates 146 and 148 are slidably supported on the bed plate 140 for movement of the chucks 56 and 58 toward and away from the loading supports 52 and 54. In FIGS. 8 and 9, chuck 58 is shown in the retracted position and chuck 56 is shown in the extended position although during operation both chucks are usually retracted and extended together. The end caps 14 and 16 are shown in the supported position on the loading supports 52 and 54 held in recesses (not shown) in the supports. The recesses may be in communication with a source of vacuum for holding the end caps on the loading supports. Sensing means such as electric eyes 150 may be mounted on the loading supports 52 and 54 to control the vacuum communicated to the recesses so that there is a vacuum in the recesses when the end caps 14 and 16 are inserted in the recesses and then the vacuum is discontinued when the chucks 56 and 58 engage the end caps prior to moving them to the retracted position over the end cap holder 44.

Each of the sliding plates 146 and 148 are connected to a power means such as cylinders 152 and 154, respectively, mounted on the bed plate 140. Pistons in the cylinders 152 and 154 are connected to the sliding plates 146 and 148 by a rodless linkage for moving the sliding plates and chucks 56 and 58 between the extended and retracted positions.

Referring especially to FIG. 10, the compliant mounting of the chuck 58 is shown in greater detail and the following description which applies to chuck 58 will also apply to chuck 56. A supporting ring 156 mounted on the sliding plate 146 has oversize openings 158 positioned circumferentially around the ring in which bolts 160 of a lesser diameter are located. The bolts 160 are threaded in a chuck support plate 162 and have resilient means such as coil spring 164 interposed between the chuck support plate and the ring 156. Each of the bolts 160 is compliantly supported in the opening 158 by a nut 166 having a conical surface engageable with a matching conical surface of a washer 168. This compliant mounting permits the chuck 58 to move radially and axially of axis 170 of the chuck during removal of the chuck from the loading support 52 and during positioning of the end cap 14 in a recess in the assembly apparatus 22.

As shown in FIG. 10, the chuck 58 has radially movable jaws 172 slidably mounted on the chuck support plate 162 and urged radially inward by resilient means such as coil springs 174. Power means for expanding the jaws 172 is provided by a cylinder 176 mounted on the chuck support plate 162 and having a piston connected to a piston rod 178 carrying a conical cam 180 for engaging cam followers such as rollers 182 mounted on each of the jaws 172. In operation, movement of the piston to the left, as shown in FIG. 10, urges the jaws 172 radially outward and movement of the piston to the right permits the jaws to be moved radially inward by the springs 174. In this embodiment, the end cap 14 has a cylindrical opening into which the jaws 172 are axially movable and then radially movable for engagement with the wall of the end cap.

The loading and unloading apparatus 10 may be supported by suitable means and, as shown in FIGS. 4 and 5, vertical legs 184 are fastened to the track member 24 and supported on a floor or other suitable surface. The air spring assembly apparatus 22 is of the type described and shown in copending U.S. patent application Ser. No. 437,146, filed Oct. 17, 1982, now U.S. Pat. No. 4,471,520 issued Sept. 18, 1984. It is understood that the loading and unloading apparatus 10 is adaptable for other assembly apparatus where components must be fed to the apparatus and the finished product removed automatically.

While a certain representative embodiment and details have been shown for the purpose of illustrating the invention, it will be apparent to those skilled in the art that various changes and modifications may be made therein without departing from the spirit or scope of the invention.

What is claimed is:

1. A method of loading air spring components and unloading an air spring from an air spring assembly apparatus in which an end cap is inserted in at least one open end of a tubular member for crimping of a ring positioned over said tubular member against the wall of said end cap comprising:
   (a) moving a shuttle mechanism including an air spring unloader, a tubular member loader and an end cap holder to a first position with said air spring unloader at an operating position of said assembly apparatus for receiving an assembled air spring from said assembly apparatus, with said loader positioned at a feeding position spaced from said operating position for receiving said tubular member and further with said end cap holder at an end cap feeding position spaced from said operating position for receiving an end cap;
   (b) moving said shuttle mechanism to a second position with said unloader positioed at an unloading location for transfer of said air spring from said unloader and with said end cap holder at said operating position for transfer of an end cap to said assembly apparatus; and
   (c) moving said shuttle mechanism to a third position with said loader positioed at said operating position of said assembly apparatus for transfer of said tubular member to said assembly apparatus.

2. The method of claim 1 wherein said tubular member loader is mounted on said shuttle mechanism between said air spring unloader and said end cap holder and said loader is moved past said operating position when said shuttle mechanism is moved from said first position to said second position to locate said end cap holder at said operating position for transfer of said end cap to said assembly apparatus.

3. The method of claim 1 wherein said shuttle mechanism is moved from said first position to said second position a distance equal to the distance between said air spring unloader and said end cap holder.

4. The method of claim 3 wherein said shuttle mechanism is moved from said second position to said third position a distance less than the distance between said air spring unloader and said end cap holder.

5. The method of claim 1 wherein said air spring unloader has a cradle member vertically movable between an upper position and a lower position including the steps of lowering said cradle from said upper position to said lower position after unloading said air spring in said second position and before moving said unloader into said operating position in said first position and then raising said cradle to said upper position to engage and support said air spring in said first position.

6. The method of claim 1 wherein said tubular member loader has a cradle member vertically movable between an upper position and a lower position including the steps of lowering said cradle from said upper position to said lower position after said tubular member is transferred to said assembly apparatus in said third position and then raising said cradle to said upper position after it is moved to said first position.

7. The method of claim 1 wherein an end cap loading support having a recess for holding said end cap is located at said end cap feeding position and said end cap holder includes a chuck for engaging said end cap including the steps of placing an end cap in said recess while said shuttle mechanism is in said second and third positions and then extending said chuck into engagement with said end cap in said first position for transferring said end cap to a retracted position on said end cap holder.

8. The method of claim 7 including the step of extending said chuck to insert said end cap into said air spring assembly apparatus in said second position.

9. The method of claim 1 wherein a tubular member positioning guide is located at said feeding position of said tubular member loader for locating one end of said tubular member including the steps of positioning said ring over said end of said tubular member while said shuttle mechanism is disposed in said second or third positions and then placing said tubular member on said loader with an end against said positioning guide while said shuttle mechanism is in said first position.

10. A loading and unloading apparatus for loading air spring components and unloading an air spring from an assembly apparatus in which an end cap is inserted in at least one open end of a tubular member for crimping of a ring positioned over said tubular member against the wall of said end cap comprising a track member providing a path adjacent an operating position of said assembly apparatus, a shuttle mechanism having a base member carried by said track member and movable along said path, an air spring unloader and an end cap holder mounted on said base member at spaced-apart locations, a tubular member laoder mounted on said base member at a location spaced from said unloader and said end cap holder, said shuttle mechanism being movable along said path to a first position where said air spring unloader is positioned at said operating position of said air spring assembly apparatus for transferring said air spring to said unloader, said shuttle mechanism being movable to a second position where said end cap holder is positioned at said operating position for transferring said end cap to said assembly apparatus and said shuttle mechanism being movable to a third position where said tubular member loader is positioned at said operating position for transferring said tubular member to said assembly apparatus.

11. The apparatus of claim 10 wherein when said shuttle mechanism is in said first position said air spring unloader is positioned for transfer of said air spring to said unloader, said loader is positioned at a tubular member feeding position spaced from said operating position for receiving said tubular member and said end cap holder is positioned at an end cap feeding position for receiving an end cap.

12. The apparatus of claim 10 wherein when said shuttle mechanism is in said second position said air spring unloader is positioned at an unloading location for transfer of said air spring from said unloader and said end cap holder is positioned at said operating position of said air spring assembly apparatus for transfer of an end cap to said assembly apparatus.

13. The apparatus of claim 10 wherein the distance traveled by said shuttle mechanism from said first position to said second position is the same as the distance between said air spring unloader and end cap holder on said base member.

14. The apparatus of claim 10 including a first stop means connected to said track member to limit movement of said shuttle mechanism in a first direction to said first position, a second stop means connected to said track member to limit movement of said shuttle mechanism in a second direction to said second position and a third stop means connected to said track member interposed between said first stop means and said second stop means to limit movement of said shuttle mechanism in said first direction to said third position.

15. The apparatus of claim 14 wherein said third stop means includes a retractable stop plate movable into a retracted position during movement of said shuttle mechanism from said first position to said second position and from said third position to said first position.

16. The apparatus of claim 10 including a cylinder mounted on said track member, a piston movable in said cylinder in response to changes in air pressure in said cylinder, and said piston being connected to said base member for moving said shuttle mechanism along said path.

17. The apparatus of claim 10 wherein said air spring unloader and said tubular member loader each comprise a vertically movable cradle for supporting said tubular member and said air spring and power means to raise said cradle.

18. The apparatus of claim 17 wherein said cradle comprises two spaced-apart cradle sections to accommodate a collar member at a position between the ends of said tubular member, said cradle sections being adjustably mounted on said base member for changing the distance between said cradle sections to accommodate different length tubular members.

19. The apparatus of claim 17 including an overarm pivotally mounted on said spring unloader and on said tubular member loader and power means for swinging said overarm between a closed clamping position over said cradle and an open release position spaced from said cradle.

20. The apparatus of claim 10 wherein a loading support for said end cap is located at one side of said path adjacent said end cap holder in said third position of said shuttle mechanism, said end cap holder including a bed plate member connected to said base member, a sliding support member slidably mounted on said bed plate member, an expandable chuck for gripping said end cap, said expandable chuck being mounted on said sliding support member for transferring said end cap between a retracted position of said chuck over said end cap holder to an extended position of said chuck adjacent said loading support or said assembly apparatus.

21. The apparatus of claim 20 including a resilient connection between said expandable chuck and said sliding support providing a compliant mounting of said chuck for adjusting the position of said chuck during removal of said end cap from said loading support and during placing of said end cap in said air spring assembly apparatus.

22. The apparatus of claim 20 including power means for moving said sliding support to transfer said end cap, said power means including a cylinder mounted on said bed plate member, a piston in said cylinder movable in response to fluid pressure in said cylinder and said piston being connected to said sliding support.

23. The apparatus of claim 20 wherein said loading support includes a recess for holding said end cap, vacuum means in communication with said recess for holding said end cap in said recess, and control means mounted for actuation in response to movement of said chuck means into engagement with said end cap for regulating the communication of vacuum to said recess so that said end cap can be removed by said end cap holder.

24. A transfer apparatus for a tubular member comprising a support member, a vertically movable cradle mounted on said support member for supporting said tubular member, power means to raise the lower said cradle relative to said support member, said cradle comprising two spaced-apart sections adjustably mounted on said support member for changing the distance between said sections to accommodate different length tubular members, and said transfer apparatus further including an overarm for holding said tubular member in said cradle, said overarm being pivotally mounted on said support member and power means for swinging said overarm between a closed clamping position over said cradle and an open release position spaced from said cradle.

25. A transfer apparatus for an end cap member comprising a bed plate member, a sliding support member slidably mounted on said bed plate member, an expandable chuck mounted on said sliding support member for transferring said end cap member between a retracted position of said chuck over said transfer apparatus to an extended position of said chuck for picking up said cap member from a loading support for inserting said cap member in an air spring assembly apparatus, first power means for actuating said expandable chuck and a second power means for moving said chuck between said retracted position and said extended position.

26. The transfer apparatus of claim 25 including a resilient connection between said expandable chuck and said sliding support member providing a compliant mounting of said chuck for adjusting the position of said chuck to conform with variable positions of said end cap member.

27. The transfer apparatus of claim 25 including a chuck support plate mounted on said sliding support member, circumferentially spaced jaws mounted slidably on said support plate for movement into and out of engagement with said end cap member, said first power means including a cylinder mounted on said chuck support plate, a piston in said cylinder having a piston rod carrying a cam engageable with a cam follower on each jaw for expanding said jaws into engagement with said end cap member in response to communication of fluid pressure to said cylinder and resilient means for contracting said jaws in response to the absence of fluid pressure in said cylinder.

28. The transfer apparatus of claim 25 wherein said second power means includes a cylinder fastened to said bed plate member and a piston in said cylinder connected to said sliding support member for moving said chuck between said retracted position and said extended position in response to communication of fluid pressure with opposite sides of end piston in said cylinder.

* * * * *